United States Patent [19]
Mizrahi

[11] Patent Number: 6,147,785
[45] Date of Patent: Nov. 14, 2000

[54] COHERENT CROSSTALK ATTENUATION APPARATUS

[75] Inventor: Victor Mizrahi, Columbia, Md.

[73] Assignee: Ciena Corporation, Linthicum, Md.

[21] Appl. No.: 09/014,489

[22] Filed: Jan. 28, 1998

[51] Int. Cl.[7] .............................. H04J 14/02; H04B 10/20
[52] U.S. Cl. .......................... 359/124; 359/125; 359/127; 359/119
[58] Field of Search ..................... 359/119, 125, 359/127, 161

[56] References Cited

U.S. PATENT DOCUMENTS

| | | | |
|---|---|---|---|
| 5,717,795 | 2/1998 | Sharma et al. | 385/24 |
| 5,926,590 | 7/1999 | Mao | 385/24 |
| 5,969,840 | 10/1999 | Roberts | 359/161 |

*Primary Examiner*—Leslie Pascal
*Assistant Examiner*—Dalzid Singh
*Attorney, Agent, or Firm*—Daniel N. Daisak; David L. Soltz

[57] ABSTRACT

A optical device is provided for reducing coherent crosstalk associated with a particular channel within a communications network. An attenuator is coupled between an emitter associated with a first node and a receiving element associated with a second node. The attenuator adjusts the signal power level generated by the emitter such that the signal power is within the dynamic range of the receiving element.

11 Claims, 1 Drawing Sheet

COHERENT CROSSTALK ATTENUATION APPARATUS

FIELD OF INVENTION

The present invention relates generally to optical communication systems and more particularly to a system and apparatus for matching the output of optical transmitters with the dynamic range of optical receivers within a communications network, as well as substantially reducing crosstalk associated with particular optical channels.

BACKGROUND OF INVENTION

Wavelength Division Multiplexing (WDM) is a technique used to transmit a plurality of optical channels via an optical waveguide medium where each channel carries information signals within a network or system. Each channel within the WDM signal is associated with a particular wavelength, thereby increasing the information capacity of fiber optic systems. WDM optical networks have traditionally been used for long haul point-to-point networks. However, with the increasing demands on communication systems, WDM optical networks can also be used in smaller system configurations, such as local telephone or data networks. In these systems, communication signals are usually transmitted over a limited geographic area to various nodes within a network, thereby avoiding the need for amplifiers. A particular node can be configured to drop one or more information bearing or payload channels from the WDM signal, process the information contained in the dropped channels and add channels containing new information to the WDM signal for transmission to other nodes in the network. An optical add/drop multiplexer present at each node may be used to drop the particular channel from the WDM signal and subsequently add the channel back to the WDM signal prior to transmission to another network node while allowing the remaining channels to passthrough.

Nodes within these types of networks can be separated by optical paths of differing lengths. In order for nodes to successfully receive WDM signals within the network, the power associated with the WDM signal transmitted between nodes varies depending upon the length of the optical path between the origination and destination nodes. For example, when a channel is added back to the WDM signal at a particular node within a network, the associated transmitter provides sufficient power to allow the signal to travel to the destination node and its associated receiver. However, if the destination node of a particular channel is in close proximity to the transmitting or source node, the transmitting node may provide too much power to the signal. This causes a problem because optical receivers have a corresponding "dynamic range" whereby an increase in the input optical power and the associated output electrical current have a linear or substantially linear relationship. If input power levels increase excessively, the receiver output current can saturate and no longer increase with corresponding increases in input optical power. As a result, the optical signal input to the receiver cannot be accurately detected.

Moreover, when a channel is dropped by an optical add/drop multiplexer, a portion of that channel signal may leak into the pass-through channels. When the dropped channel is subsequently added back to the pass-through channels, coherent crosstalk may occur between the added channel signal and the leaked portion of that channel. This crosstalk may be sufficient to cause signal recognition problems.

Thus, there is a need to control/fix the output power of node transmitters to correspond to the dynamic range of node receivers within a network. In addition, there is a need to reduce coherent crosstalk associated with particular channel transmissions.

SUMMARY OF INVENTION

The present invention meets the above-referenced needs by providing an optical device including a first transfer element coupled along a closed optical path which carries a plurality of information bearing channels, each at a respective wavelength. The first transfer element is configured to add a first of the plurality of optical channels where the first optical channel has an associated signal power. A second transfer element is coupled to the first transfer element along the optical path. The second transfer element is configured to select the first optical channel from the plurality of optical channels. An attenuator is coupled to the first transfer element and is configured to adjust the power associated with the first optical channel received at the second transfer element.

DETAILED DESCRIPTION

Figure 1:
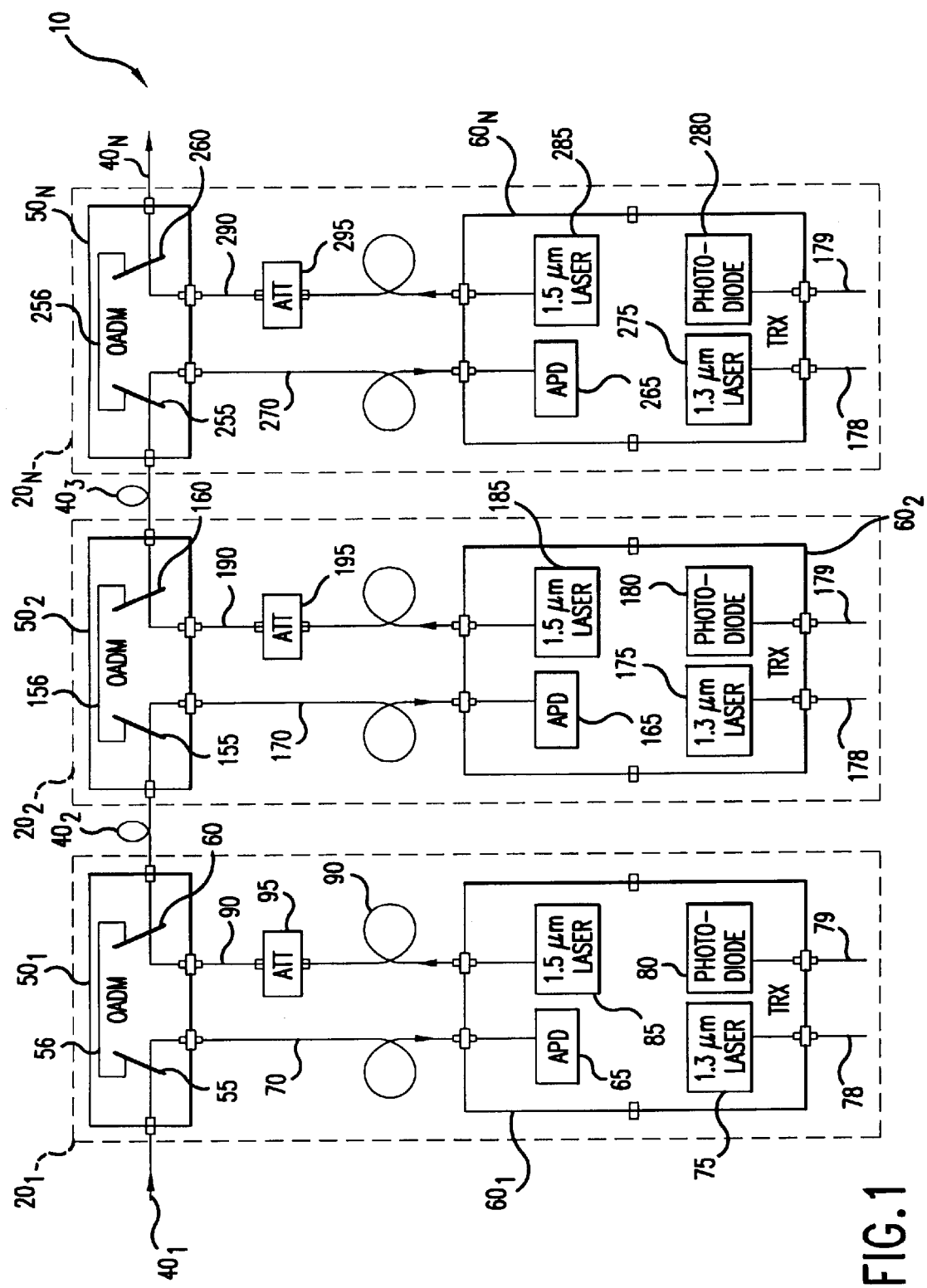
FIG. 1 illustrates a schematic diagram of a network utilizing an optical device in accordance with the present invention.

Turning to the drawings in which like reference characters indicate the same or similar elements, FIG. 1 schematically illustrates a portion of an optical network 10 having optical nodes $20_1, 20_2 \ldots 20_N$ and corresponding optical paths $40_1, 40_2, 40_2 \ldots 40_N$. Each node may, for example, represent separate geographical locations within network 10 linked by a segment of optical fiber. Moreover, network 10 may be configured as a ring, star, or other network architecture.

Each node $20_1 \ldots 20_N$ is configured to receive a WDM signal having a plurality of wavelengths $\lambda_1 \ldots \lambda_j$ carried via optical paths $40_1 \ldots 40_N$. The wavelengths included in the WDM signal are typically, but not necessarily, within the 1500 nm range which corresponds to the minimum signal attenuation associated with silica-based fibers. Each optical channel carries information at an associated data rate within network 10. Each node $20_1 \ldots 20_N$ is configured to drop and add one or more payload channels at a respective one of the wavelengths $\lambda_1 \ldots \lambda_j$ through the use of transfer elements, for example, optical add/drop multiplexers (OADMs). An example of a type of add/drop multiplexer which may be employed in accordance with the present invention is described in copending U.S. patent application entitled "Optical Add/Drop Multiplexer" filed on Oct. 23, 1997 having unofficial Ser. No. 08/956,807 and assigned to the assignee of the present invention (hereinafter referred to as "the Optical Add/Drop Multiplexer Application") which is incorporated herein by reference. Each node includes at least one OADM configured to drop one or more payload channels having wavelengths $\lambda_1 \ldots \lambda_j$. Each OADM may also be configured to drop the same or different channels from the WDM signal depending on the desired network configuration. Each node $20_1, 20_2 \ldots 20_N$ includes at least one transceiver $60_1, 60_2 \ldots 60_N$ associated with OADMs $50_1 \ldots 50_N$, respectively.

Although the following description refers to node $20_1$, it is understood that this description can be applied to nodes $20_1, 20_2 \ldots 20_N$ within network 10 with a difference being that each node may drop/add the same or different WDM channels. In addition, OADM $50_1$ is being described as an example of an OADM capable of dropping and adding at least one payload channel consistent with the OADM disclosed in the Optical Add/Drop Multiplexer Application. However, it should be understood that other OADM configurations may be employed which are capable of performing the same or similar function, for example, the combination of optical circulators and one or more fiber gratings as described in co-pending U.S. Patent Application Ser. No.

08/846,086 entitled "Optical Add-Drop Multiplexers Compatible With Very Dense WDM Optical Communication Systems" filed on Apr. 25, 1997.

OADM $50_1$ includes a filtering element 55 and a combining element 60. Filtering element 55, for example an interference filter, is configured to drop at least a payload channel having a particular wavelength, for example $\lambda_1$. The remaining WDM channels at wavelengths $\lambda_2 \ldots \lambda_j$ pass through OADM 50 to combining element 60 via line 56. The payload channel having wavelength $\lambda_1$ is supplied to terminal equipment where the information carried on the payload channel is processed. The payload channel is added back to the pass-through WDM channels by way of combining element 60, for example an interference filter, and supplied to either the next OADM within node $20_1$ or to the next node, e.g. node $20_2$, by way of optical path $40_2$.

Transceiver $60_1$ associated with OADM $50_1$ includes a receiving element 65, such as a photodiode, which receives the payload channel having wavelength $\lambda_1$ via line 70 and generates electrical signals in response thereto. These signals are used to modulate, either directly or externally, a second light source 75 included in transceiver $60_1$ which is coupled to line 78. In this manner, light source 75 is used to transmit the information received via the payload channel having wavelength $\lambda_1$ in the 1.5 µm range to a channel having the same or a different wavelength, e.g. 1.3 µm so that it can be recognized by customer receiving equipment (e.g. SONET equipment) coupled to transceiver $60_1$ via line 78.

Transceiver $60_1$ includes a photodiode 80 which receives information signals from customer transmission equipment at a particular wavelength via line 79 and generates electrical signals in response thereto. These signals are used to modulate, either directly or externally, light source 85 which transmits the optical channel having wavelength $\lambda_1$ to OADM $50_1$ by way of combining line 90. An optical attenuator 95 is disposed between light source 85 and OADM $50_1$ along line 90. Attenuator 95 reduces the intensity of the light signal produced at source 85. The degree of attenuation can depend on the configuration of network 10 and the power level balancing needed for signal transmission between nodes $20_1 \ldots 20_N$. Attenuator 95 may be a variable or fixed attenuator. In the case of a variable attenuator, the amount of attenuation may be controlled remotely, for example, through the use of a service channel carried within network 10. Alternatively, the service channel may also be used to control the power associated with light source 85. Attenuator 95 may be included in a separate module along line 90 or may be included within transceiver $60_1$. After attenuation, the optical channel having wavelength $\lambda_2$, is added to the WDM pass-through channels by way of combining element 60 and supplied to OADM $50_2$ via line $40_2$.

A small portion of the channel having wavelength $\lambda_1$ dropped by OADM $50_1$ may be passed-through with the remaining WDM channels supplied to combining element 60 by way of line 56. This signal can cause crosstalk problems when the dropped channel is added back to the WDM signal at combining element 160. However, the attenuation of the dropped channel having wavelength $\lambda_1$ at the transmitting node within network 10 is such that the strength of the signal leaked into the pass-through channels of OADM $50_1$ is sufficiently low to not substantially interfere with the added channel. The placement of attenuator 95 in close proximity to light source 85 reduces the power associated with the added channel so that cross talk levels associated with the added channel are alleviated at destination nodes within network 10.

OADM $50_2$ receives the WDM signal from OADM $50_1$ and drops a payload channel having a particular wavelength, for example $\lambda_2$, by way of filtering element 155. The remaining WDM channels $\lambda_1, \lambda_3 \ldots \lambda_j$ pass through OADM $50_2$ to combining element 160 via line 156. Transceiver $60_2$ is coupled to OADM $50_2$ by way of line 170 and includes a receiving element 165, such as a photodiode, which receives the payload channel having wavelength $\lambda_2$ and generates electrical signals in response thereto.

Receiving element 165 has a corresponding dynamic range where the input power has a linear or substantially linear relationship with the output electrical current. If the optical signal generated at source 85 has as its intended destination node $20_2$, for example, and node $20_2$ is in close proximity to node $20_1$, the power associated with this optical signal must be within the dynamic range of receiving element 165 in order to be accurately detected. Accordingly, attenuator 95 adjusts the power associated with the optical signal generated at node $20_1$ by source 85 such that when the signal is received by node $20_2$, the associated signal power is within the dynamic range of receiving element 165. Attenuator 95 may also be configured so that the total link loss approaches the maximum loss budget of network 10.

Alternatively, the power associated with light source 85 may be altered by reducing the drive current associated with light source 85 if directly modulated or by adjusting the modulating element (not shown) drive if externally modulated. In either case, the signal power associated with source 85 is within the dynamic range of receiving element 165.

The electrical signals generated by receiving element 165 modulate light source 175. These optical signals are used to transmit the information received via the payload channel having wavelength $\lambda_2$ in the 1550 nm range to a channel having the same or a different wavelength, e.g. 1.3 µm so that it can be recognized by customer receiving equipment coupled to line 178. Similar to transceiver $60_1$, transceiver $60_2$ includes a photodiode 180 which receives information signals via line 179 and generates electrical signals in response thereto. These signals are used to modulate light source 185 which transmits the optical channel having wavelength $\lambda_2$ to OADM $50_2$ by way of line 190. An optical attenuator 195 is disposed between light source 185 and OADM $50_2$ along line 190 for controlling the power of the light signal produced via source 185 to correspond to the dynamic range of the receiving element, for example receiving elements 265 and/or 65. The optical channel having wavelength $\lambda_2$, is added to the WDM pass-through channels by way of combining element 160 and supplied to OADM $50_2$ via line $40_2$.

As described above, coherent crosstalk problems may arise when two nodes are in close proximity. For example, if OADM $50_1$ is in relatively close proximity to OADM $50_2$, and the channel having wavelength $\lambda_1$ is added at node $20_1$ and the same channel is dropped and added at node $20_2$, coherent crosstalk problems will result when a portion of the dropped channel leaks through OADM $50_2$ and the same channel is added back via combining element 160. Typical coherent crosstalk levels, for example, using interference filters as the filtering and combining elements in each of the OADMs, is in the range of approximately −25 dB. These values may vary depending upon the OADM configurations and components employed. However, a desirable crosstalk level, for example, for the signal received at line 170 of node $20_2$ can be in the range of approximately −40 dB. Therefore, the added channel having wavelength $\lambda_1$ supplied by source 85 of transceiver $60_1$ must be attenuated by 15 dB. Accordingly, attenuator 95 can be a 15 dB attenuator thereby providing −40 dB of crosstalk for the channel having wavelength $\lambda_1$ supplied from OADM $50_1$ to OADM $50_2$.

OADM $50_N$ receives the WDM signal from OADM $50_2$ and drops a payload channel having a particular wavelength, for example $\lambda_j$, by way of filtering element 255. The remaining WDM channels $\lambda_1 \ldots \lambda_{j-1}$ pass through OADM $50_N$ to combining element 260 via line 256. Transceiver $60_N$ is coupled to OADM $50_2$ by way of line 270 and includes a receiving element 265, such as a photodiode, which receives the payload channel having wavelength $\lambda_j$ and generates electrical signals in response thereto. The attenuator associated with the transmitting node, for example attenuators 95, 195, etc., adjust the power of the signal to be received by node 20N such that the signal power corresponds to the dynamic range associated with receiving element 265. The electrical signals generated by receiving element 265 are used to modulate light source 275 which supplies information to customer equipment via line 278.

Transceiver $60_N$ also includes a photodiode 280 which receives customer information signals via line 279. These signals are used to modulate light source 285 which transmits the optical channel having wavelength $\lambda_j$ to OADM $50_N$ by way of line 290. Attenuator 295 is disposed between light source 285 and OADM 502 along line 290 for controlling the power of the light signal produced via source 285 as described above. The optical channel having wavelength $\lambda_j$ is added to the WDM pass-through channels by way of combining element 260 and supplied to OADM $50_N$ via line $40_N$.

While the foregoing invention has been described in terms of the embodiments discussed above, numerous variations are possible. Accordingly, modifications and changes such as those suggested above, but not limited thereto, are considered to be within the scope of the present invention.

What is claimed is:

1. An optical device comprising:
    a first transfer element coupled along an optical path, said optical path carrying a plurality of information bearing channels, each at a respective wavelength, said first transfer element being configured to add an optical channel to said plurality of information bearing channels having an associated signal power;
    a second transfer element coupled to said first transfer element along said optical path, said second transfer element configured to select said optical channel from said plurality of information bearing channels; and
    an attenuator coupled to said first transfer element, said attenuator being configured to adjust the power associated with said optical channel received by said second transfer element such that coherent crosstalk levels associated with said optical channel is reduced by approximately 15 dB or greater.

2. The optical device in accordance with claim 1 further including a receiving element having an associated dynamic range, said receiving element coupled to said second transfer element, said attenuator adjusting said power associated with said optical channel such that said power level associated with said optical channel is within said dynamic range of said receiving element.

3. The optical device in accordance with claim 2 wherein said second transfer element is an optical add/drop multiplexer.

4. The optical device in accordance with claim 1 wherein said first transfer element is spaced from said second transfer element along said optical path within a communications network, said attenuator adjusts said power level associated with said optical channel an amount such that a total link loss associated with said network approaches a predetermined maximum loss budget.

5. The optical device in accordance with claim 1 wherein said first transfer element is an optical add/drop multiplexer.

6. The optical device in accordance with claim 1 wherein said first transfer element is located in a first node within a communications network and said second transfer element is located in a second node within said network, said network being configured as a ring.

7. An optical device comprising:
    an emitter for transmitting an optical signal at an associated power level;
    a first add/drop multiplexer coupled to said emitter along a closed optical path, said first add/drop multiplexer adding said optical signal to a first set of a plurality of optical signals;
    a second add/drop multiplexer coupled to said first add/drop multiplexer along said closed optical path, said second add/drop multiplexer selecting said optical signal from said first set of a plurality of optical signals;
    a receiving element having a corresponding dynamic range, said receiving element coupled to said second add/drop multiplexer and configured to receive said optical channel; and
    an attenuator coupled to said emitter for adjusting said power level associated with said optical channel to be within said dynamic range of said receiving element such that coherent crosstalk levels associated with said optical channel is reduced by approximately 15 dB or greater.

8. The optical device in accordance with claim 7 wherein said closed optical path is configured as a ring.

9. A method for reducing crosstalk associated with an optical channel within a communications network comprising the steps of:
    generating an optical channel having a total power level;
    selecting said optical channel from a plurality of optical channels carried along an optical path;
    transmitting a first portion of said optical channel along said optical path, said first portion of said optical channel having an associated first power level;
    transmitting a second portion of said optical channel to a receiving element, said second portion of said optical channel having an associated second power level; and
    adjusting said total power level associated with said optical channel such that said first power level is reduced and said second power level is sufficient for recognition by said receiving element, and coherent crosstalk levels associated with said optical channel is reduced by approximately 15 dB or greater.

10. The method in accordance with claim 9 wherein said receiving element has an associated dynamic range, said step of adjusting said total power level associated with said optical channel produces a second power level within said dynamic range of said receiving element.

11. The method in accordance with claim 9 wherein said step of adjusting said total power level associated with said optical channel reduces coherent cross-talk associated with said optical channel.

* * * * *